Sept. 6, 1960 V. W. PETERSON 2,951,543
THRUST-RESPONSIVE MECHANISM
Filed March 5, 1956 3 Sheets-Sheet 3

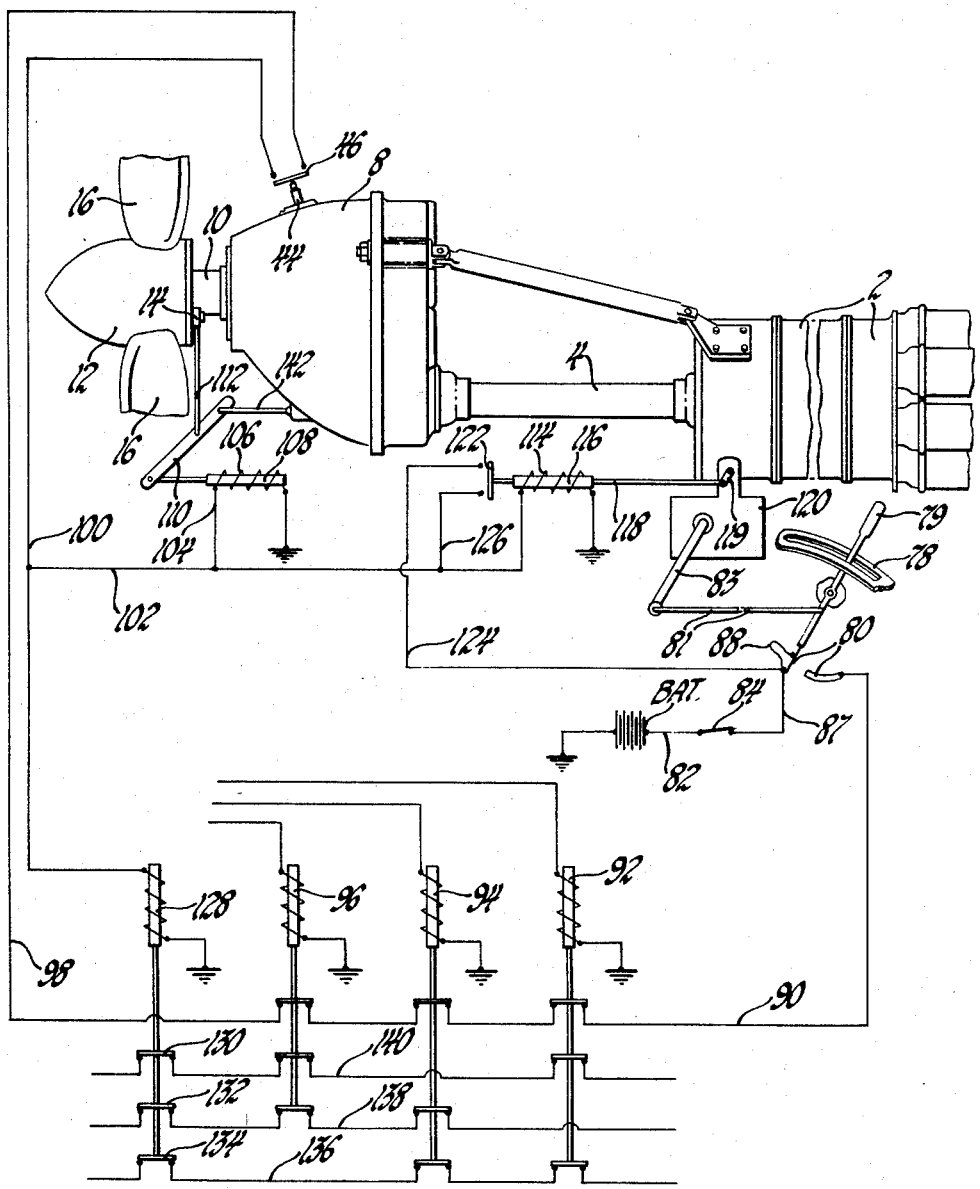

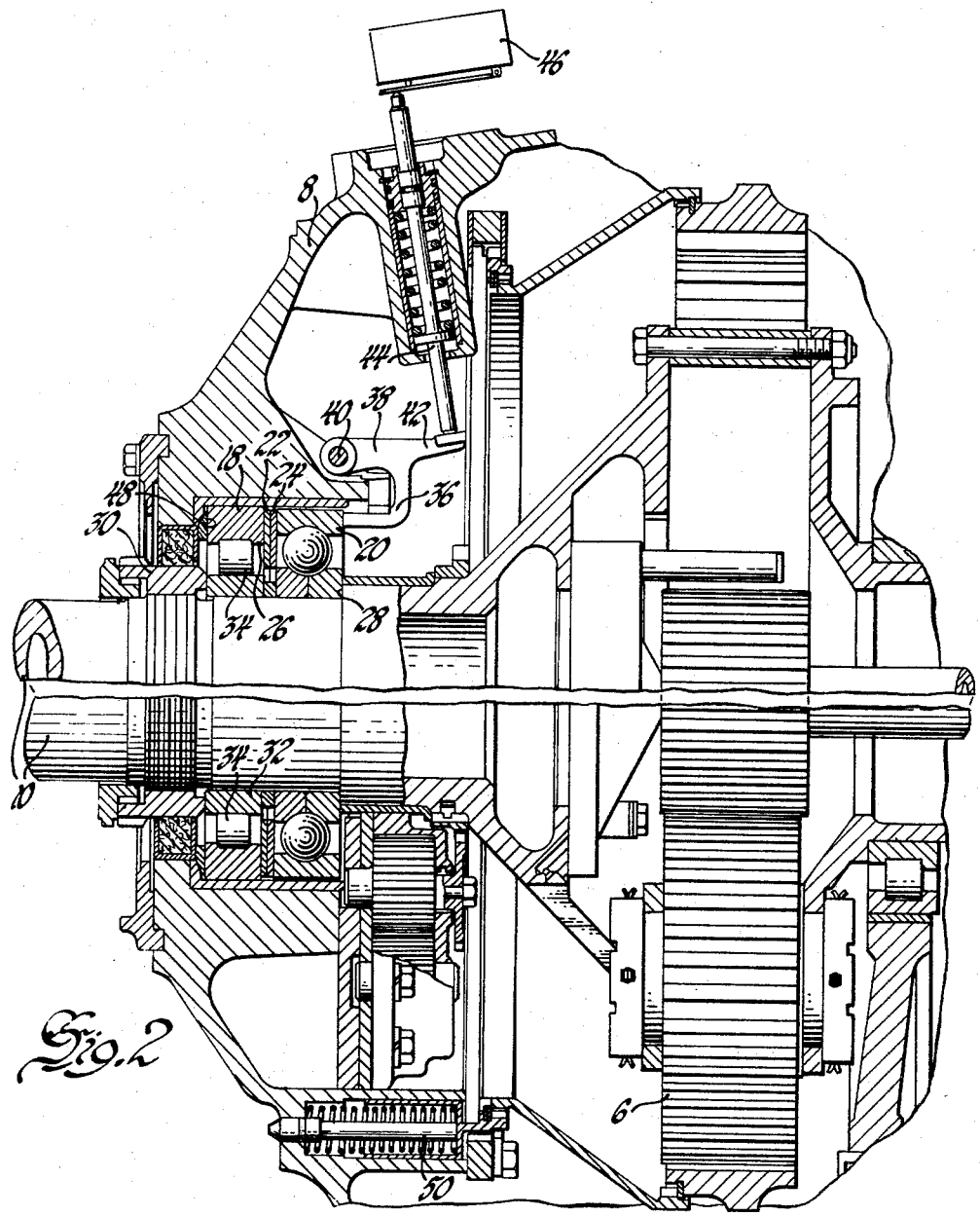
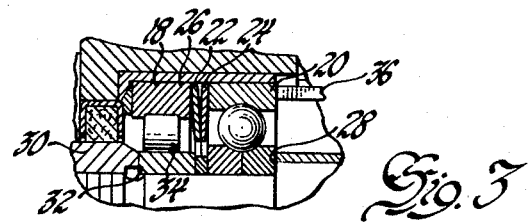

INVENTOR.
Victor W. Peterson
BY
J. C. Thorpe
ATTORNEY

United States Patent Office 2,951,543
Patented Sept. 6, 1960

2,951,543

THRUST-RESPONSIVE MECHANISM

Victor W. Peterson, Indianapolis, Ind., assignor to General Motors Corporation, Detroit, Mich., a corporation of Delaware Filed Mar. 5, 1956, Ser. No. 569,535

10 Claims. (Cl. 170—160.13)

This invention relates generally to propulsion systems and more particularly to aircraft propulsion systems in which a plurality of propellers, each having variable pitched blades, are used. In most such propulsion systems each propeller is driven by a separate power plant. If the power plant which supplies power to any particular propeller should fail the propeller attached to the failing power plant "windmills" in the medium through which the craft is passing. This windmilling effect results in an increased drag on the aircraft which could be substantially reduced if the blades of the propeller were feathered, i.e., turned at 90-degree angles so that they slice smoothly through the air with a minimum of resistance. While, normally, the pilot has manual controls at his disposal which would enable him to feather the propeller attached to the failing power plant, his attention is drawn to so many important details especially during take-off that he might not notice or more likely he would notice and try to do something about it too late.

The present invention seeks to overcome any such excusable delay on the part of the pilot under the adverse circumstances outlined above by making the feathering action automatic should there be a predetermined loss of positive thrust or, to put it another way, a certain negative thrust exerted by the propeller. By positive thrust is meant the thrust the propeller is exerting when it is either pulling or pushing the aircraft. Negative thrust would be the thrust on the propeller caused by the air through which it is being pushed or pulled by the remaining propeller-driving power plants of the aircraft.

It is therefore a primary object of the present invention to utilize the loss of positive thrust or the negative thrust on a propeller to feather the blades of the propeller so as to reduce as much as possible the resultant drag of the propeller as it is pushed or pulled through the air.

It is a more specific object of the present invention to utilize a belleville spring tending to resist this negative thrust which when overcome thereby operates a suitable propeller feathering device.

It should be mentioned here that while the present invention so far has been discussed as being primarily for aircraft, it is equally applicable for craft propelled through water. Accordingly, for further and more specific objects of this invention reference may be had to the accompanying detailed description and drawings, in which:

Figure 1 represents a schematic illustration of the thrust-sensitive feathering device and also a unique control therefor.

Figure 2 is an enlarged section in elevation illustrating in detail the thrust-responsive portion of the device and in particular how belleville springs are sensitive to the positive and negative thrusts of the propeller shaft.

Figure 3 is a fragmentary view indicating the condition of the belleville springs when negative thrust is being exerted.

Figure 4:
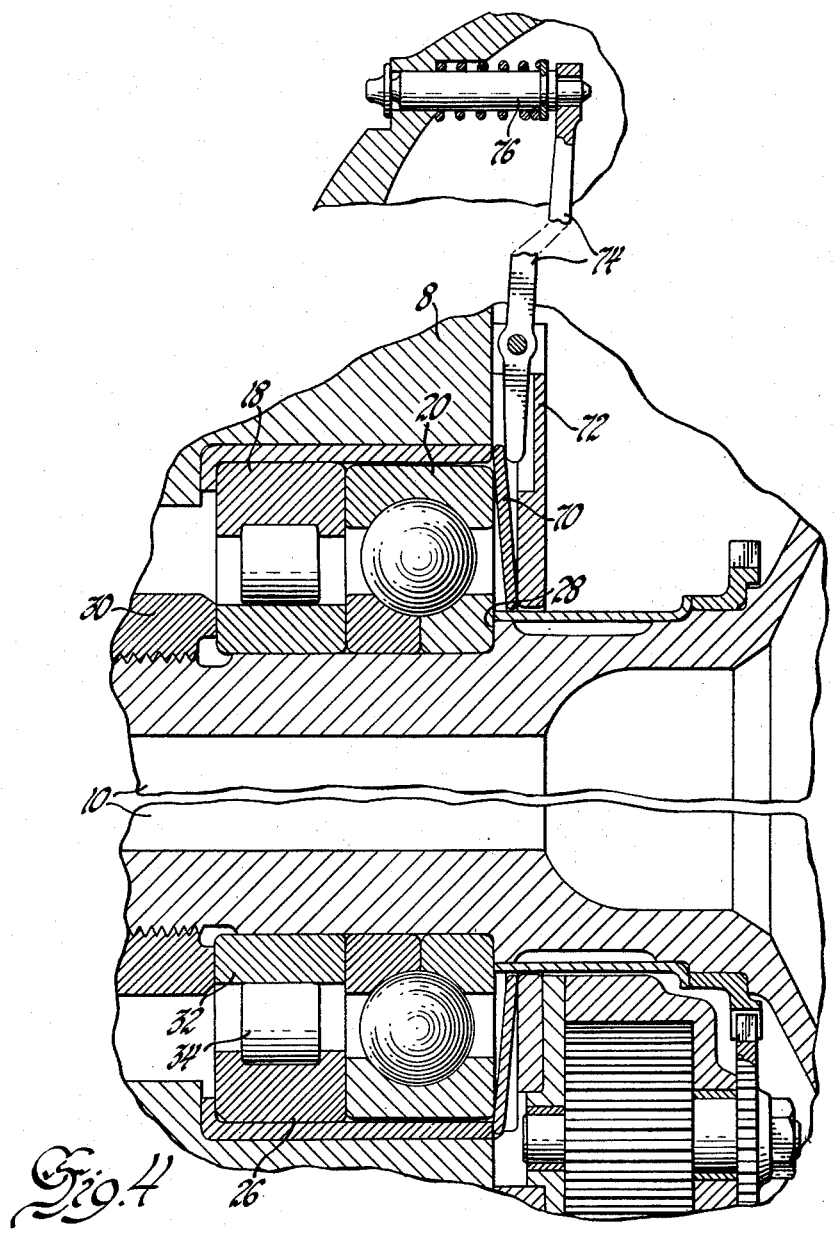
Figure 4 shows a different form of the invention in which a single belleville spring is used to actuate a pivoted lever which in turn controls the usual propeller feathering device.

Turning briefly to Figure 1 for an over-all picture of an aircraft type in which the invention is applicable, a power plant for an aircraft engine is partially shown and indicated by a numeral 2. The power plant 2 drives a shaft within a housing 4 connected to a set of reduction gears 6 (see Figure 2) in the reduction gear case 8. The reduction gears 6 are operatively coupled to drive the propeller shaft 10 having mounted on one end thereof a variable pitch propeller 12 which is provided with conventional actuating means 14 for varying the pitch of the blades 16 of propeller 12. Power plant 2 is provided with the usual fuel control means 120 under the control of the pilot through the throttle handle 79 forming a part of the quadrant 78. It will be noted that throttle handle 79 is connected to the fuel control means 120 by the links 81, 83. Located between the fuel control means and the power plant is a fuel passage which is closable by suitable operation of lever 119. A complete electro-mechanical control system is shown in Figure 1 for the automatic thrust-responsive feathering means whose detailed description is being deferred to be included with a complete description of the operation of the automatic feathering means. It should be appreciated that most of Figure 1 shows only one of a plurality of power plant propulsion assemblies. The relays 92, 94 and 96 and circuits 136, 138 and 140, however, are shown on Figure 1 to symbolize that a plurality (in this case, four) of power plant propulsion assemblies and controls therefor make up the aircraft in which the present invention is deemed most applicable.

Referring now particularly to Figure 2, a portion of the workings inside one of the gear cases 8 is shown which, as already mentioned, includes the reduction gear set 6 which is operatively connected through suitable connections to propeller shaft 10 to drive the shaft 10. The shaft is suitably journaled for rotation in the gear casing 8 by a roller bearing 18 and a ball bearing 20 mounted in a bearing cavity in casing 8. The shaft 10 is mounted so that it has a limited amount of axial movement with respect to the casing 8. The shaft 10 and thrust bearing 20 can move axially relative to the outer race 26 and rollers of bearing 18. Interposed between the outer races of bearings 18 and 20 are a pair of belleville springs 22 and 24 which are formed and positioned so as to tend to separate the outer race of ball bearing 20 from the outer race 26 of roller bearing 18. It will be observed that the inner races of bearings 18 and 20 are contained between a shoulder 28 on shaft 10 and a thrust collar 30 so that there is no relative axial movement of these inner races on the shaft 10. As mentioned, however, the outer race 26 and the rollers 34 of the roller bearing 18 can move axially relative to the ball bearing 20 a slight amount. Engaging the outer race of ball bearing 20 is the end of one arm 36 of a lever 38 pivotally supported at 40 by the reduction gear case 8. The lever 38 is provided with a second arm 42 engaging a spring-loaded plunger 44 which when actuated operates a switch 46. The switch 46 energizes the control circuit of Figure 1, which is to be described in detail later. For the moment, it suffices to say that switch 46 acts to control the propeller feathering means 14. It will thus be observed that if the shaft 10 is being driven through the reduction gear set 6 so as to turn the propeller the shaft 10 will tend to move to the left, as viewed in Figure 2. Since the shoulder 28 engages the ball bearing 20 which acts as a thrust bearing, the positive thrust of the propeller on shaft 10 will compress the belleville springs 22 and 24 between the ball bearing 20 and the roller bearing 18 which in turn has its outer race thrust against the gear casing at the point 48. If, however, the power plant driving the propeller through the reduction gear set 6 and shaft 10 should fail so that there is a sufficient loss of positive thrust of shaft 10 (to the left as viewed in the drawing) the belleville springs 22 and 24 will tend to separate (see Figure 3) causing the shaft to be forced in the opposite direction so as to actuate the lever 38 and plunger 44, thereby actuating the switch 46, energizing the circuit controlling the feathering of the blades of the propeller attached to shaft 10.

It should be mentioned at this point that in actuality the embodiment of the invetnion shown in Figure 2 responds to a predetermined loss in positive thrust and not initially to negative thrust. In other words, the belleville springs 22, 24 are loaded by the positive thrust of the propeller 12. If this positive thrust drops below a certain prescribed minimum (which, of course, depends on the stiffness of the belleville springs), say 500 lbs. of thrust, then although there still may be some positive thrust the feathering mechanism will be actuated.

The embodiment in Figure 4 differs from that shown in Figures 2 and 3 in that it is responsive to negative thrust.

Turning now to Figure 4, it will be noted that the shaft 10 is journaled for rotation in roller bearing 18 and ball thrust bearing 20 which are mounted abutting each other between the thrust collar 30 and shoulder 28. A single belleville spring 70 concentric with shaft 10, however, is utilized to sense the negative thrust and is interposed between the outer race of ball bearing 20 and a suitable abutment 72 which forms a part of the reduction gear case 8. The shaft 10 including the bearing sets 18 and 20, as before, can move slightly axially and the belleville spring 70 acts to resist such movement. If, however, the propeller starts to windmill due to loss of driving power through the shaft 10 so that a negative thrust is applied, the belleville spring 70 becomes compressed and again actuates a suitable lever 74 pivotally connected to the reduction gear case 8. The lever 74 is operatively connected at its opposite end of a spring-loaded plunger 76 which again may either opperate switch 46 or else be connected by a suitable linkage to the propeller feathering means 14 in Figure 1. The embodiment of Figure 4 then responds only to negative thrust for any positive thrust will cause shoulder 28 to hold bearing sets 18, 20 to the left, as viewed in the figure. It is only when a negative thrust is exerted which must first overcome the biasing effect of belleville spring 70 that lever 74 will be actuated to feather the blades 16 of propeller 12.

Returning again primarily to Figure 1, the novel control means for feathering the propeller in response to loss of positive thrust, or to negative thrust, will now be described. The pilot's throttle quadrant 78 operatively controls a switching device 80 which will be closed only after the pilot has moved his throttle a sufficient number of degrees to assure that the propeller is exerting plenty of positive thrust. Closure of the switch 80 by the pilot arms the thrust-sensitive means for feathering the propellers. This is accomplished by the following circuit which begins with the battery BAT and includes conductors 82; a manually closed switch 84; conductor 87; conductor 88; the now closed contacts of switch 80; conductor 90; the normally closed interlocks of relays 92, 94 and 96 and conductor 98 to switch 46. Now, if power plant 2 should fail so that there is a loss of positive thrust sufficient to allow the belleville springs 22 and 24 of the embodiment of Figure 2 to separate thereby actuating lever 38, plunger 44 will close switch 46. Closure of switch 46 then allows current to flow from conductor 98 to conductor 100, conductor 102, and conductor 104, thereby energizing coil 106 of solenoid 108. Energization of solenoid 108 through the links 110 and 112 controls the feathering mechanism 14 so as to feather the blades 16 of propeller 12. At the same time current will soon be supplied through conductor 102 to the coil 114 of solenoid 116. Energization of solenoid 116 acts through the rod 118 and lever 119 to close off the fuel passage provided between the power plant 2 and the fuel control device 120 so as to cut off the supply of fuel to the power plant 2. In addition to solenoid 108 and solenoid 116 being energized by closure of switch 46, a third solenoid relay 128 is also energized. This relay opens its normally closed interlocks 130, 132, 134 so as to disarm similar automatic feathering controls responsive to loss of positive thrust for the propellers driven by the other engines of the aircraft. This will prevent automatic feathering of more than one propeller on take off. Energization of solenoid 116 also closes its interlock 122 to thereby set up a holding circuit or lock-in means for relays 116, 108, and 128. This holding circuit may be traced from the positive side of the battery BAT through conductor 82; switch 84; conductors 87, 124; now closed interlock 122; and conductors 126 and 102, energizing coil 114 of relay 116, coil 106, and relay 128 independently of switch 46. The holding circuit just described is provided in case the thrust switch 46 should open before the feathering cycle is complete. As mentioned, solenoids 92, 94, 96 and circuits 136, 138, 140 have been indicated to represent the automatic feathering control circuits for the other engines.

To unfeather the blades of the propeller it is necessary to open the manual switch 84 which de-energizes the aforementioned holding circuit.

In addition to this reverse propeller thrust-responsive means it will be observed that a negative torque-responsive means is also provided in the embodiment of Figure 2. This negative torque-responsive means is similar to that shown in application Serial No. 544,995, Victor W. Peterson et al., filed November 4, 1955. By negative torque is meant torque opposite in direction to that when the engine drives the propeller which may result, for example, if the engine fails and the propeller windmills and drives it through the reduction gear. Since the negative torque-responsive means is adequately described in the aforementioned United States application no further description is deemed necessary other than to say that it activates the spring-loaded plunger 50. Plunger 50 is connected by a suitable link 142 to links 110 and 112 to control feathering means 14. In other words, negative torque will also cause automatic feathering. There is one important difference between the automatic feathering means responsive to negative torque and the automatic feathering means responsive to loss of positive thrust or to negative thrust. In the first case, if the torque becomes positive the propeller will unfeather whereas, in the second, if the thrust becomes sufficiently positive again the propeller will remain feathered. While this does not necessarily have to be so it is felt important since there are a number of factors which cause a momentary loss of torque without any substantial loss of power in which case permanent feathering might be considered extremely undesirable. While the description so far has indicated that the invention is for automatic feathering of propeller blades it should be kept in mind that feathering is nothing more than a special change in the pitch angle of the propeller blades. In other words, the invention in a broader sense can also be termed an automatic device for varying the pitch or propeller blades.

Numerous other embodiments and applications of the invention will occur to others without departing from the spirit thereof and it is intended to hereby cover all such embodiments and applications.

I claim:

1. In a propulsion system, in combination, an engine, a propeller shaft driven thereby, a variable pitch propeller mounted on the shaft, means mounting the propeller shaft on the engine with limited freedom of movement of the shaft axially thereof relative to the engine, means yieldably biasing the shaft axially thereof connecting the shaft to the engine, the last-mentioned means exerting a bias equal to a substantial portion of normal propeller thrust, control means coupled to the shaft actuated by axial movement of the shaft in the direction opposite to that in which the shaft is urged by normal propeller thrust, and means connecting the control means to the propeller operable to increase the pitch of the propeller upon actuation of the control means.

2. A system as recited in claim 1 in which the biasing means biases the shaft in the same direction as normal propeller thrust.

3. A system as recited in claim 1 in which the biasing means biases the shaft in the opposite direction to normal propeller thrust.

4. In a propulsion system, in combination, an engine, a propeller shaft driven thereby, a variable pitch propeller mounted on the shaft, means mounting the propeller shaft on the engine with limited freedom of movement of the shaft axially thereof relative to the engine, means yieldably biasing the shaft axially thereof connecting the shaft to the engine, the last-mentioned means exerting a bias equal to a substantial portion of normal propeller thrust, control means coupled to the shaft actuated by axial movement of the shaft against the biasing means, means connecting the control means to the propeller operable to increase the pitch of the propeller upon actuation of the control means, and means connecting the control means to the engine operable to shut down the engine upon actuation of the control means.

5. In a propulsion system, in combination, an engine, a propeller shaft driven thereby, a variable pitch propeller mounted on the shaft, means mounting the propeller shaft on the engine with limited freedom of movement of the shaft axially thereof relative to the engine, means yieldably biasing the shaft axially thereof comprising a belleville spring mounted around the shaft connecting the shaft to the engine, the last-mentioned means exerting a bias equal to a substantial portion of normal propeller thrust, control means coupled to the shaft actuated by axial movement of the shaft in the direction opposite to that in which the shaft is urged by normal propeller thrust, and means connecting the control means to the propeller operable to feather the propeller upon actuation of the control means.

6. In a propulsion system, in combination, a housing, a propeller shaft, a thrust bearing connecting the shaft to the housing, the thrust bearing being mounted in the housing with limited freedom of movement axially of the shaft, two abutments on the housing limiting the movement of the thrust bearing, a belleville spring mounted around the shaft connected to the thrust bearing and the housing and biasing the thrust bearing axially of the shaft toward one abutment, a variable-pitch propeller, including means for increasing the pitch thereof, mounted on the propeller shaft and normally biasing the shaft axially thereof in one direction, a device connected to the thrust bearing so as to be actuated by movement thereof in the other direction, and means connecting the device to the pitch-increasing means so as to operate the pitch-increasing means upon actuation of the device, the belleville spring being so constructed and arranged as to exert a bias equal to a substantial portion of the normal propeller thrust.

7. A system as recited in claim 6 in which the belleville spring biases the propeller shaft in the same direction as normal propeller thrust.

8. A system as recited in claim 6 in which the belleville spring biases the propeller shaft in the opposite direction to normal propeller thrust.

9. In a propulsion system, in combination, a housing, a propeller shaft, a thrust bearing connecting the shaft to the housing, the thrust bearing being mounted in the housing with limited freedom of movement axially of the shaft, two abutments on the housing limiting the movement of the thrust bearing, a belleville spring mounted around the shaft connected to the thrust bearing and the housing and biasing the thrust bearing axially of the shaft toward one abutment, a variable-pitch propeller, including means for increasing the pitch thereof, mounted on the propeller shaft and normally biasing the thrust bearing against the other abutment, a device connected to the thrust bearing so as to be actuated by movement thereof toward the said one abutment, means connecting the device to the pitch-increasing means so as to operate the pitch-increasing means upon actuation of the device, and lock-in means connected to the device and to the pitch-increasing means to hold the last-mentioned means operated after actuation of the device.

10. In a propulsion system, in combination, a housing, a propeller shaft, a thrust bearing connecting the shaft to the housing, the thrust bearing being mounted in the housing with limited freedom of movement axially of the shaft, two abutments on the housing limiting the movement of the thrust bearing, a belleville spring mounted around the shaft connected to the thrust bearing and the housing and biasing the thrust bearing axially of the shaft toward one abutment, a variable-pitch propeller, including means for increasing the pitch thereof, mounted on the propeller shaft, and normally biasing the thrust bearing against the other abutment, a switch device connected to the thrust bearing so as to be actuated by movement thereof toward the said one abutment, means connecting the switch device to the pitch-increasing means so as to operate the pitch-increasing means upon actuation of the switch device, an engine connected to the propeller to drive the propeller, the engine including a fuel-supplying means and means for disabling the fuel-supplying means, means connecting the switch device to the disabling means to operate the disabling means to shut off the engine fuel supply upon actuation of the switch device, and lock-in means connected to the switch device and to the pitch-increasing means and fuel-supply disabling means to hold the two last-mentioned means operated after actuation of the switch device.

References Cited in the file of this patent

UNITED STATES PATENTS

| | | |
|---|---|---|
| 1,923,399 | Sharp | Aug. 22, 1933 |
| 1,998,450 | Davis | Apr. 23, 1935 |
| 2,321,381 | Hammond | June 8, 1943 |
| 2,325,404 | Irons | July 27, 1943 |
| 2,437,189 | Forsyth | Mar. 2, 1948 |
| 2,595,345 | Englehardt | May 6, 1952 |
| 2,732,019 | Stebbins | Jan. 24, 1956 |

FOREIGN PATENTS

| | | |
|---|---|---|
| 156,619 | Australia | May 20, 1954 |

UNITED STATES PATENT OFFICE
CERTIFICATE OF CORRECTION

Patent No. 2,951,543                                                  September 6, 1960

Victor W. Peterson

It is hereby certified that error appears in the printed specification of the above numbered patent requiring correction and that the said Letters Patent should read as corrected below.

Column 3, line 11, for "invetnion" read -- invention --; line 39, for "end of" read -- end to --; line 40, for "opperate" read -- operate --; line 74, for "soon" read -- also --; column 4, line 62, for "or" read -- of --; column 5, lines 22 and 23, strike out "against the biasing means" and substitute instead -- in the direction opposite to that in which the shaft is urged by normal propeller thrust --; column 6, line 33, after "shaft" strike out the comma.

Signed and sealed this 18th day of April 1961.

(SEAL)
Attest:

ERNEST W. SWIDER                                        DAVID L. LADD
Attesting Officer                                            Commissioner of Patents